July 2, 1963 J. STALEY 3,096,000
METHOD AND APPARATUS FOR DISCHARGING FLUID BY PRESSURE
OF AN ISOLATED PROPELLANT IN CONTACT WITH
AN ADSORBER OR ABSORBER THEREOF
Filed Nov. 4, 1959 3 Sheets-Sheet 1

INVENTOR.
JOHN STALEY
BY Glenn & Jackson
attorneys

INVENTOR.
JOHN STALEY
BY Glenn & Jackson
attorneys

July 2, 1963  J. STALEY  3,096,000
METHOD AND APPARATUS FOR DISCHARGING FLUID BY PRESSURE
OF AN ISOLATED PROPELLANT IN CONTACT WITH
AN ADSORBER OR ABSORBER THEREOF
Filed Nov. 4, 1959  3 Sheets-Sheet 3

INVENTOR.
JOHN STALEY
BY *Glenn & Jackson*
attorneys

United States Patent Office 3,096,000
Patented July 2, 1963

3,096,000
METHOD AND APPARATUS FOR DISCHARGING FLUID BY PRESSURE OF AN ISOLATED PROPELLANT IN CONTACT WITH AN ADSORBER OR ABSORBER THEREOF
John Staley, Chesterfield County, Va., assignor to Reynolds Metals Company, Richmond, Va., a corporation of Delaware
Filed Nov. 4, 1959, Ser. No. 850,836
10 Claims. (Cl. 222—1)

This invention relates to the use of a propellant gas and a modifying agent for said gas to discharge fluids, such as beer and other fluids, in an improved manner.

According to this invention fluids in sealed containers are discharged under the pressure of a propellant gas in a manner so the pressure applied by the propellant gas upon the fluid is maintained within desired limits and does not vary unduly as the fluid is emptied from the container.

For example, fluids are often placed in a sealed container together with a propellant gas which, in turn, is segregated and sealed from actual contact with the fluid to be discharged from the container through a discharge valve or the like. The propellant gas generally is placed in a flexible or expandable chamber in the container so a wall of the expandable chamber pushes against the fluid to be discharged under the impulse or pressure of the propellant gas. Such a construction generally exerts too high a pressure on the fluid when the container is relatively "full" of the fluid to be discharged, because it is necessary to provide sufficient propellant gas to produce sufficient pressure when the container is relatively "empty" of such fluid.

When gas charged liquids, such as beer and other carbonated beverages have been stored in and dispensed from a container or keg at the place of use, it has been the custom periodically to draw servings from the container or keg, as desired by the users or customers. However, the beer or other carbonated beverage gradually becomes flat within such a keg. This is because, as the beverage is emptied from the keg, a considerable part of the $CO_2$ and other desirable gas constituents of the beer become separated from the beer to fill the space within the keg which is vacated by the beer as it is periodically discharged and served. Consequently, the later or last servings from the keg, when the keg is relatively empty of beer, are undesirably flat because of dissipation of such previously dissolved "carbonating" gases into the upper part of the container or keg.

To overcome this gradual flattening of the beer or other carbonated beverage, an expandable chamber or flexible bag has been provided in the upper part of the container or keg which contains a propellant gas under pressure. Such bag expands and fills the space which previously had to be filled by the dissipated "carbonating" gas of the beer. The beer flattening process is thus avoided.

However, the propellant gas in the bag has to expand with the expansion of the bag, with a consequent loss in the internal pressure of the propellant gas due to such expansion. It has heretofore been necessary for the propellant gas to have a relatively high pressure when the keg is relatively full of beer in order for such propellant gas to have sufficient pressure when the keg is in relatively empty condition.

This relatively high pressure of the propellant gas in the bag of prior constructions, which is required when the keg is relatively full produces a violent discharge of the beer at the serving faucet, which in turn produces excessive foam in the glass, mug, or other drinking receptacle which is held under the faucet.

Beer, for example, when produced at the brewery, has "carbonating" gases ($CO_2$ and other gases) dissolved in it with a pressure of from 8½–15 p.s.i. Serving faucet valve equipment is capable of discharging beer at such a pressure into a drinking receptacle without excessive foaming when such a faucet is prpoperly manipulated. However, if a bag is placed inside a keg with a propellant gas sealed in such bag, such propellant gas must have a much higher pressure than 8½–15 p.s.i., when the keg is relatively "full." $CO_2$ is a preferred propellant gas which is placed in the bag, and such propellant gas (which is separate from the "carbonating" gas in beer) must have pressures such as 75–80 p.s.i., under "full" or nearly "full" conditions of the keg with reasonable head room in the keg for the propellant gas, in order to have 8½–15 p.s.i., under "empty" or nearly "empty" conditions of the keg. Consequently, periodic servings of beer will be discharged from the keg at pressures varying from 75–80 p.s.i., at "full" which are gradually reduced to 8½–15 p.s.i., at "empty." The servings during the emptying of the first half of the beer in the keg, particularly, are quite likely to have objectionably excessive foam conditions.

According to this invention, a modifying medium, such as an adsorbing, absorbing, or otherwise modifying medium, is placed in the bag or other expandable chamber with the propellant gas so the propellant gas pressures are materially reduced under such relatively "full" conditions and are maintained at the desired minimum pressures required at relatively "empty" conditions.

In the case of beer and other "carbonated" beverages, it is desirable and convenient to use $CO_2$ as a propellant gas, because of its availability and physical properties.

A modifying medium of this invention imparts a modified or effective internal pressure of the propellant gas in the bag or expansible chamber which is:
  (a) Within the limits of the container,
  (b) Within an unobjectionable foaming pressure of the beer or other liquid, and
  (c) Within the flow rate desired at the faucet.

For example, a satisfactory modifying medium for use with $CO_2$ as a propellant gas for beer and the like is activated alumina, which may be used in a manner as herein more specifically described.

Other propellant gases, and other modifying agents may be used in connection with containers and liquids to be discharged from such containers.

Accordingly, it is an object of this invention to provide an improved method of discharging liquids from a container under modified pressure of a propellant gas.

Another object of this invention is to provide an improved container for discharging liquids under modified pressure of a propellant gas.

Another object of this invention is to provide an improved method of discharging gas charged liquids from a container under modified pressures of a propellant gas.

Another object of this invention is to provide an improved container for discharging gas charged liquids under modified pressures of a propellant gas.

Further objects of this invention are apparent from this description and the accompanying drawings, in which.

For brevity the invention will be described as specifically applied to beer contained in a keg-like container under the propelling force of $CO_2$ and activated alumina within a sealed flexible bag. However, it is to be understood that such disclosure is exemplary of other containers, fluids, expandable chambers, propellant gases, and modifying agents or adsorbents, which come within the scope of this disclosure.

Figure 1:
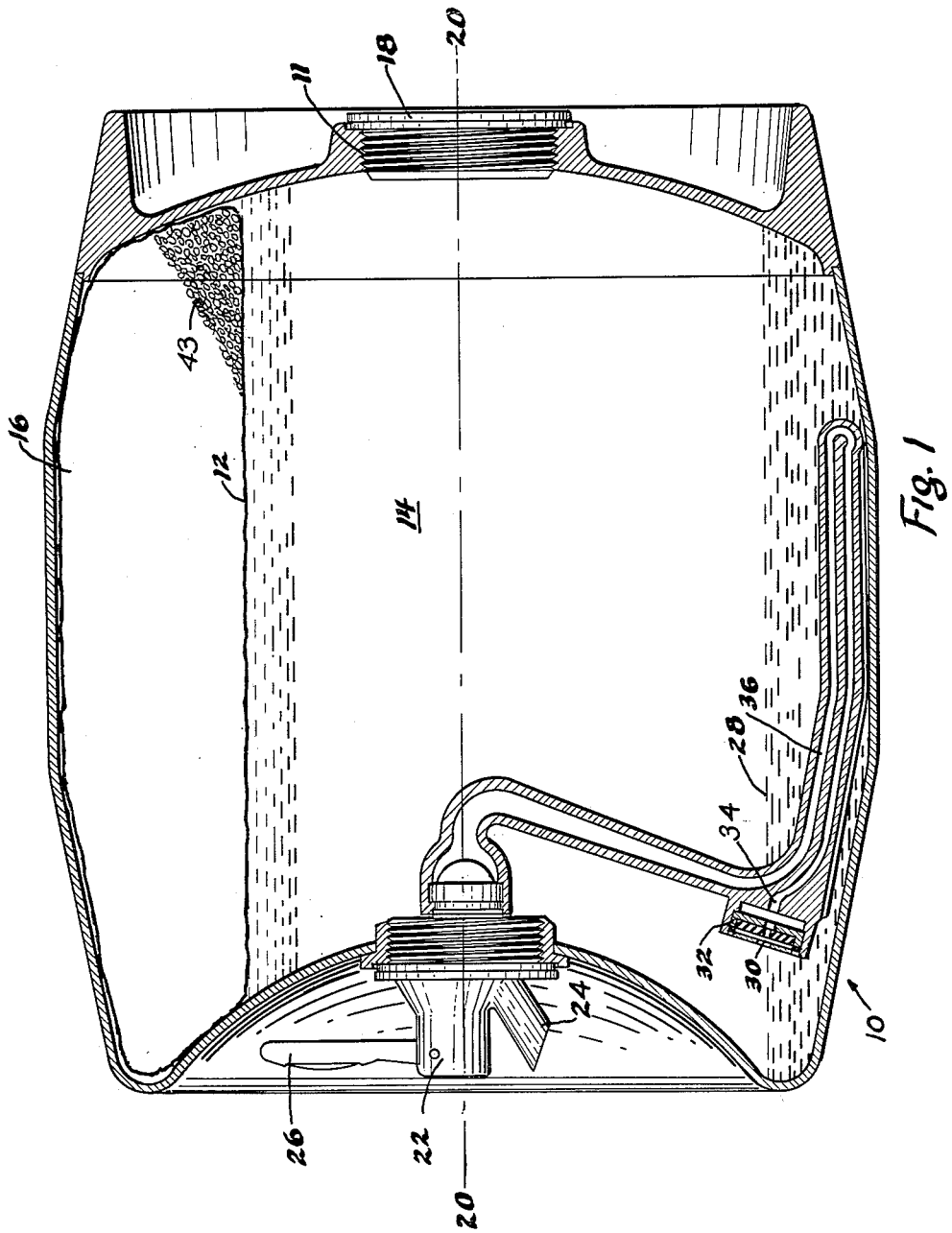
FIGURE 1 is a cross section of an apparatus in which this invention may be practiced.

FIGURE 1 shows a keg-like container 10 for beer which, without the modifying agent of this invention, is the invention by John B. Wilson. The container is intended to be filled or charged with beer through the opening 11 at a brewery to the level 12 to provide an initial body of beer 14. At that time a flexible bag 16 is also inserted through the opening 11 in the container 10. A selected amount of solid $CO_2$ (Dry Ice) is placed in the bag 16 and the bag is sealed just before it is inserted in the container 10. The bag 16 and beer 14 are then sealed in the container 10 by the plug 18 and the keg or container 10 is then stored and refrigerated at the brewery until it is delivered and placed in the usual bottle compartment of the domestic refrigerator of the customer. The flexible and impervious bag 16 is sufficiently large to unfold or distend and completely fill all of the space in container 10 as the beer is emptied from the container 10.

The keg 10 is placed in the customer's refrigerator with the keg axis 20 in horizontal position. A discharge faucet or valve 22 is provided with a faucet or beer outlet 24. The valve 22 is opened by an outward pull on the top of the handle 26 and is closed automatically by spring action, not shown, when the handle 26 is released. Beer is periodically dispensed in this manner into a drinking glass or receptacle while the keg 10 remains in the refrigerator until the level of the beer gradually moves from the normally "full" position 12 to the normally "empty" position 28 in the container 10. The words "full" and "empty" refer to the amount of beer in the keg, and not to the amount of propellant $CO_2$ and other substances in the keg. These words are also used in a broad sense and are not intended to be limited to exact full or empty positions, as is obvious. For example, the level 28 may actually be slightly lower if the keg is tilted slightly on its forward end. The upper level 12 may also be varied within reasonable limits, as is obvious.

When the faucet 22 is opened, beer enters the inlet 30 of a pressure reducing valve 32 which reduces the pressure of the beer entering the inlet 34 of the foam absorbing conduit 36 to a substantially constant pressure, such as substantially to the "carbonated" pressure of the beer, which normally is from 8 to 15 p.s.i. The beer and foam flow through the conduit 36 in which the beer reabsorbs the foam. Finally the beer is discharged at atmospheric pressure, through the spout or outlet 24 of the valve or faucet 26.

This particular container or keg is illustrated herein merely as an example of a large number of different containers from which various fluids may be discharged under the pressure of a propellant gas, modified according to this invention, which propellant gas generally is not mixed with the fluid. Containers used with this invention need not have features, such as valve 32, etc., of the Wilson keg herein specifically illustrated.

Sufficient detail of the apparatus of FIGURE 1 is described and shown herein which is pertinent to this invention.

When the container 10 is "full," so the beer is at the desired normal or maximum level 12, the internal, normal, effective, propellant gas pressure of the $CO_2$ when used by itself in the bag 16 is from 75–80 p.s.i. This condition is indicated at the point 40 in FIGURE 1, so the keg 10 in full position is shown directly below the point 40, along the vertical line 42. The beer level 12, beer body 14 and bag 16 are also shown in the "full" condition of the beer. When the keg 10 is "empty" of beer with $CO_2$ by itself in the bag 16, the internal, normal, effective, propellant gas pressure in the keg is from about 8½–15 p.s.i., as indicated at the point 44 in FIGURE 2. The pressure in the keg 10 gradually decreases as the level of the beer drops from the position 12 to the position 28, as indicated by the curve 41. The pressures produced in the keg while it is from about "half full" to "full" are quite excessive when $CO_2$ alone is used as a propellant gas in the bag 16, and are likely to produce excessive foaming at the spout 24 in any usual container of this kind, although this particular construction of John B. Wilson disclosed in this application serves beer without too objectionable an amount of foam under these conditions. However, even with the said Wilson construction, the foam is greatly reduced by the practice of this invention, as will become apparent.

Figure 6:
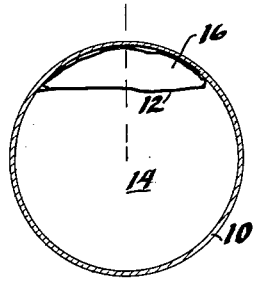
FIGURE 6 is a fragmentary view showing this modifying agent in a porous bag which is placed in the propellant gas bag.
Figure 6:
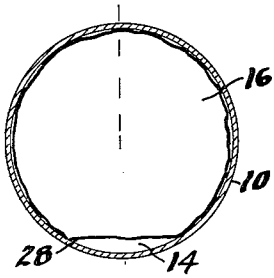
Figure 6:
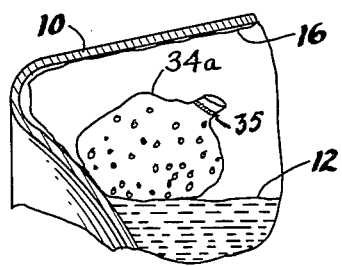

By the use of a modifying agent according to this invention, it is possible materially to reduce the internal, normal, effective, propellant gas pressure under "full" or nearly full conditions while still retaining a satisfactory propellant gas pressure under substantially "empty" conditions. Under empty or nearly empty conditions of container 10, the internal, normal, effective, propellant gas pressure is only negligibly reduced by the modifying agent of this invention. Consequently the foaming of the beer under "full" conditions is greatly reduced and satisfactory "carbonation" is maintained in the beer even at substantially "empty" conditions.

Where the liquid is beer, and the propellant gas is $CO_2$ this may be accomplished by adding a suitable modifying or adsorbent agent in the bag 16 or other expansible chamber which contains the propellant gas. A suitable modifying agent which may be used, according to this invention, is activated alumina. Such modifying agents may be placed in loose condition in the bag 16, as indicated at 43, FIGURE 1, or which may be placed in a porous bag 43a within the bag 16, as indicated in FIGURE 6. The activated alumina may be of the type designated as R2101 by the Reynolds Metals Company of Richmond, Virginia, in their catalog of June 14, 1957. Preferably the size of ¼ inch 8 mesh of said activated alumina, as listed on page 12–3–4 of said catalog is used. Another type of activated alumina which may be used is that known in the trade as Alcoa N151, of which alumina having a mesh of ⅛ inch "round" has been found satisfactory.

By way of example, and not to limit the invention, the following dimensions and quantities are suggested for use in connection with a container of the John B. Wilson type. The total internal volume of the keg may be 700 cubic inches, of which the beer in "full" position occupies 520 cubic inches and the propellant gas occupies 180 cubic inches, more or less. In the "empty" position the beer occupies as nearly 0 cubic inches as possible, and the propellant gas occupies as nearly 700 cubic inches as possible. When $CO_2$ alone, or with activated alumina, is to be used, 38–40 grams of solid $CO_2$ is placed in the bag 16. When alumina is to be added, according to this invention, 400 grams of activated alumina may be placed in the bag 16 and sealed therein with the $CO_2$. The bag 16 is impervious and is hermetically sealed with the $CO_2$ and the activated alumina in it.

Figure 2:
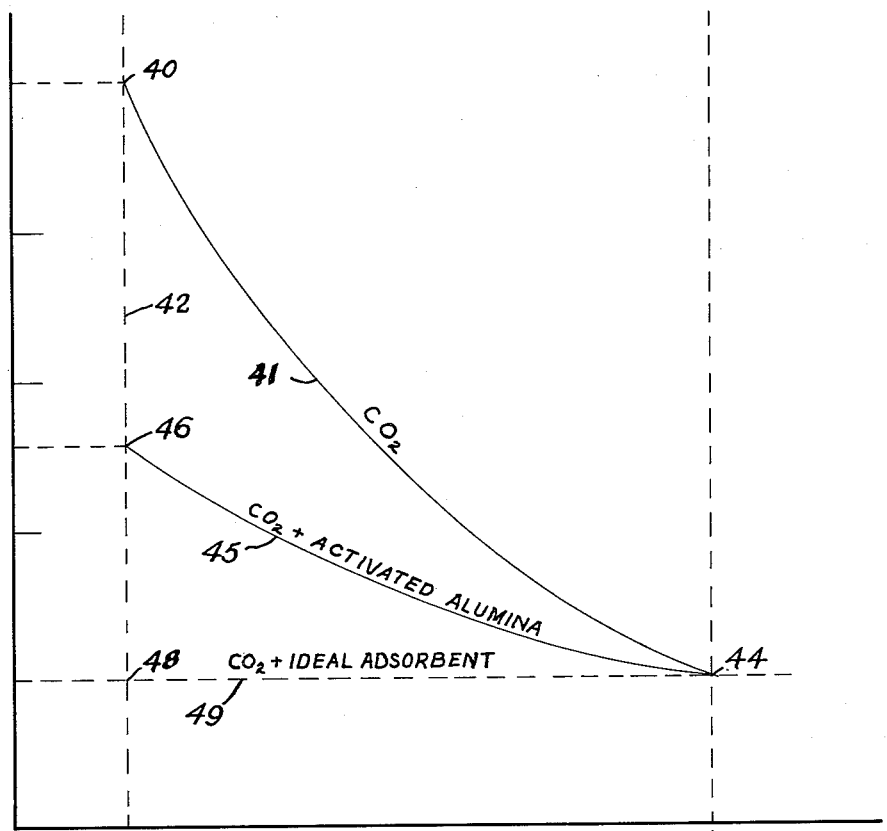
FIGURE 2 is a chart showing the pressures produced in the apparatus of FIGURE 1 by three different propelling mediums.

FIGURE 2 shows the pressure in the container with $CO_2$ alone as a propellant in curve 41, and with $CO_2$ and activated alumina as a propellant in curve 45.

The horizontal base line of FIGURE 2 indicated the volume of propellant gas in container 10, increasing in a rightward direction. The vertical base line indicates the pressure per square inch (p.s.i.) in container 10. At the "full" (of beer) position, at the left hand illustration of container 10, FIGURE 2, the internal, normal, effective pressure of $CO_2$ alone is indicated at the point 40 and is between 75 and 80 p.s.i., which is a foam producing condition, which will continue during the first half of the draws from the keg. With $CO_2$ and activated alumina such pressure is materially reduced approximately one half to 38 p.s.i., more or less, as indicated at the point 46, which is a relatively non-foaming condition. When the container approaches the "empty" (of beer) condition, at the right hand illustration of container 10 near the right ends of curves 41 and 45, the difference between the effective pressures of $CO_2$ alone (curve 41) and $CO_2$ with activated alumina (curve 45) becomes practically negligible, and at "empty" the pressures are maintained at from 8½–15 p.s.i. at point 44 with either type of propellant. Hence the carbonating gases are maintained in solution and the beer is prevented from becoming flat during the last draws from the keg. Hence $CO_2$ and alumina prevent the heavy foaming which generally takes place during the first half of the draws when $CO_2$ alone is used as the propellant, and maintain sufficient pressure during the last half of the draws.

An ideal adsorbent for use with $CO_2$, or other propellant, would have a pressure of 8½–15 p.s.i. at "full" as indicated at 48 in FIGURE 2, and 8½–15 at "empty" as indicated at 44 in FIGURE 2. The pressures in container 10 would continue at a substantially constant value from the point 48 to the point 44 as indicated by the line 49 in FIGURE 2, if $CO_2$ and such ideal adsorbent were used. However, such ideal adsorbent is not necessary for practical purposes, and is merely indicated as the ultimate of theoretical but unnecessary perfection.

Figure 3:
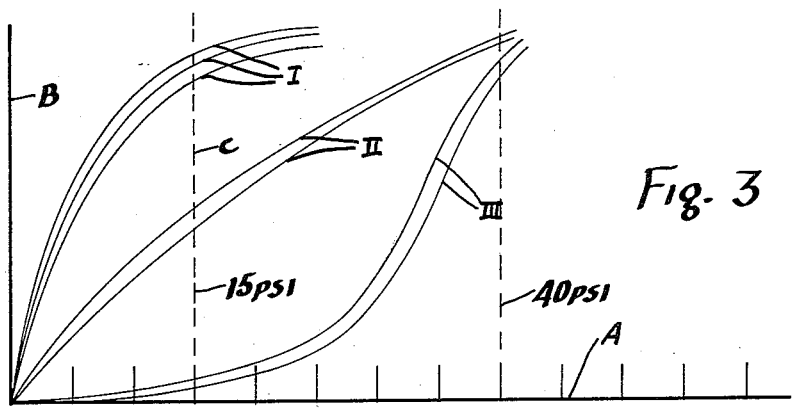
FIGURE 3 is a chart showing the three generally recognized types or classes of adsorbing or modifying mediums for modifying the pressure characteristics of a propellant gas.
Figure 4:
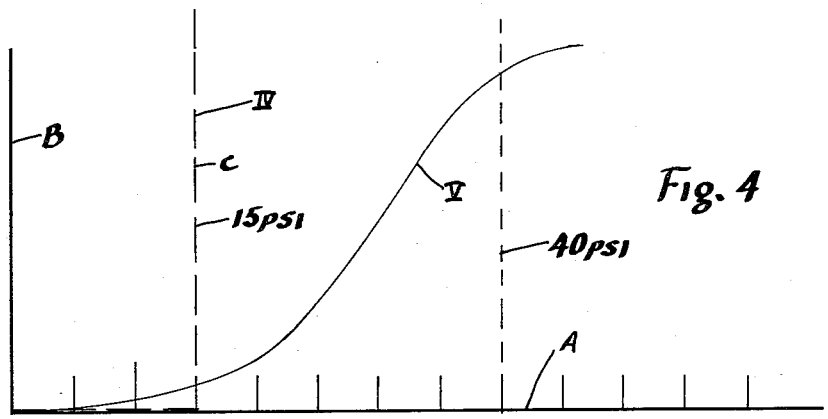
FIGURE 4 is a chart showing the pressure characteristics of an "ideal" adsorbent in combination with $CO_2$ as a propelant, and the characteristics of a sufficiently satisfactory adsorbent and $CO_2$ as a propellant.
Figure 5:
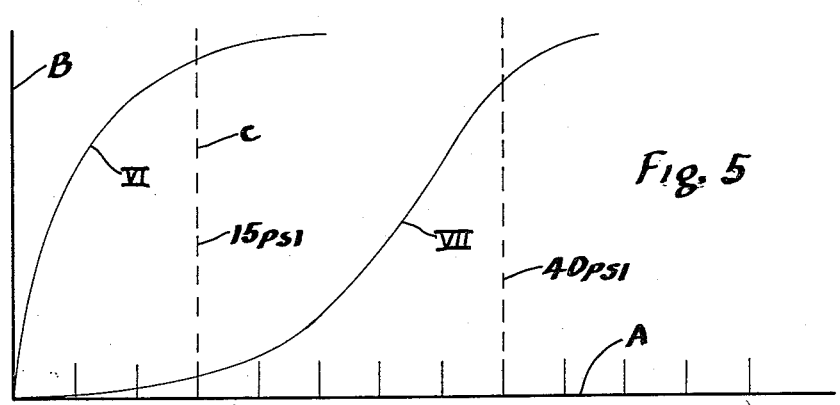
FIGURE 5 shows the pressure characteristics of activated carbon and activated alumina respectively in combination with $CO_2$ as a propellant.

FIGURES 3, 4 and 5 show how a suitable adsorbing medium for any propellant may be chosen, according to this invention. Horizontal lines A, in FIGURES 3, 4 and 5, indicate the pressure of the propellant gas while in contact with the adsorbing medium in p.s.i. The vertical lines B in FIGURES 3, 4, and 5 show the amount of propellant gas adsorbed by a unit quantity of adsorbing medium, such as grams of propellant gas per gram of adsorbing medium. The vertical lines C in FIGURES 3, 4, and 5 indicate 15 p.s.i. The 40 pound pressure line is also shown as 40 p.s.i.

A group of curves I in FIGURE 3 indicates a group of adsorbents in which a desired propellant gas, such as $CO_2$, is in contact with such adsorbent mediums. These adsorbent mediums are undesirable for this particular problem of dispensing beer and similar beverages. These adsorbents adsorb a large amount of propellant gas under low pressure, such as at 8½–15 p.s.i., as indicated by the steep rise of these curves at the left end, and hence these adsorbents do not release the gas under low pressure when it is desired to have the propellant gas supplement the beer pressure when the container 10 is near an empty condition. These adsorbents have a high surface area and high attractive forces for the material being adsorbed.

The adsorbents indicated at II are not desirable because they still adsorb a large amount of gas at low pressures, such as at 15 p.s.i. These curves still have a relatively steep rise at the left end. These adsorbents also do not release the propellant gas to supplement the beer pressure when the container 10 is near its empty condition. These adsorbents have high surface area and less attractive forces.

The adsorbents III, however, do not adsorb very much propellant at low pressures, such as 15 p.s.i., but do at high pressures. These are the most satisfactory. They have high surface area and low attractive forces. Activated alumina of the character herein disclosed is a good example of such adsorbents of type III when used with $CO_2$ as the propellant gas.

These adsorbents number III adsorb a large quantity of the propellant gas under relatively full conditions in the container 10, and hence materially reduce the normal effective pressure of the propellant gas under such relatively full conditions as at point 46 in FIGURE 2. These adsorbents number III release large quantities of propellant gas as the fluid or beer in container 10 is relatively "empty" and hence they only negligibly reduce the normal effective pressure of the propellant gas under relatively empty conditions of the container 10, as at the right end of curve 45 in FIGURE 2 which approaches closer and closer to curve 41. This closeness of the curves 41 and 45 indicates the negligible reduction in propellant gas pressure by the alumina under relatively empty conditions of container 10.

FIGURE 4 shows what an ideal adsorbent would do in the container 10 in the curve IV, where the adsorbent would adsorb all of the gas necessary at 15 p.s.i., and release the gas substantially at 15 p.s.i. Curve V shows how an adsorbent for $CO_2$ of type III, such as activated alumina, will adsorb practically nothing at 15 p.s.i., and then begins actively to adsorb to the desired level, such as at 40 p.s.i., more or less, and then levels off in its adsorbing properties.

FIGURE 5 shows how activated carbon and activated alumina adsorb $CO_2$ comparatively. Activated carbon, which is class I, FIGURE 3, and is indicated by curve VI, FIGURE 5, is undesirable as it will adsorb a large amount of $CO_2$ under 15 p.s.i., and therefore will not release it at 15 p.s.i. Activated alumina, which is indicated by curve VII in FIGURE 5, adsorbs very little $CO_2$ below 15 p.s.i., and has adsorbed a considerable amount of $CO_2$ at 40 p.s.i., and then has leveled off. This produces the desired condition which is shown in FIGURE 2.

While this invention has been specifically disclosed in connection with the dispensing of beer under the propelling force of $CO_2$ modified by activated alumina, such invention is applicable in many other arts and industries and under many other conditions.

It is thus to be seen that proper modifying mediums have been provided for propellant gases which reduce the internal effective pressures of such gases when the containers in which they are used are relatively full of fluid to be propelled. At the same time they only negligibly reduce the pressures of the propellant gases when such containers are relatively empty of such fluid.

While the embodiment of the invention now preferred has been disclosed as required by statute, other forms may be used, all coming within the scope of the claims which follow.

What is claimed is:

1. In combination: a sealed container; a fluid in said container to be discharged from said container; means for discharging said fluid from said container under controlled conditions; an expandable chamber having a movable wall pushing against said fluid in said container; a propellant gas in said chamber to push said wall against said fluid; and a modifying agent in contact with said propellant gas materially to reduce the normal effective pressure of said propellant gas when said container is relatively full of said fluid and negligibly to reduce the normal effective pressure of said propellant gas when said container is relatively empty of said fluid whereby said fluid is discharged from said container at a substantially constant pressure regardless of the amount of fluid in said container.

2. A combination according to claim 1 in which said fluid is a gas charged liquid.

3. In combination: a sealed container; a fluid in said container to be discharged from said container; means for discharging said fluid from said container under controlled conditions; a propellant gas imperviously pushing against said fluid by internal pressure; and a modifying agent in contact with said propellant gas materially to reduce the normal effective pressure of said propellant gas when said container is relatively full of said fluid and negligibly to reduce the normal effective pressure of said propellant gas when said container is relatively empty of said fluid whereby said fluid is discharged from said container at a substantially constant pressure regardless of the amount of fluid in said container.

4. A method of discharging a fluid contained in a sealed container which comprises: discharging said fluid from said container under controlled conditions by pushing against said fluid in said container by means of an isolated propellant gas under internal pressure of said gas and modifying the normal internal effective pressure of said gas with a modifying agent which materially reduces the normal effective pressure of said propellant gas when said container is relatively full of said fluid and which negligibly reduces the normal effective pressure of said gas when said container is relatively empty of said fluid whereby said fluid is discharged from said container at a substantially constant pressure regardless of the amount of fluid in said container.

5. In combination: a sealed container; a body of beer in said container to be discharged from said container; a valve for discharging said body of beer from said container under controlled conditions; a flexible impervious bag pushing against said body of beer in said container; carbon dioxide gas in said bag to push against said body of beer; and activated alumina in said bag with said carbon dioxide gas materially to reduce the normal effective pressure of said carbon dioxide gas when said container is relatively full of said body of beer and negligibly to reduce the normal effective pressure of said carbon dioxide gas when said container is relatively empty of said body of beer whereby said beer is discharged from said container at a substantially constant pressure regardless of the amount of beer in said container.

6. A method of discharging beer contained in a sealed container which comprises: periodically discharging said beer from said container under controlled conditions by pushing against said beer in said container by means of isolated carbon dioxide gas contained in an impervious bag under internal pressure of said gas and modifying the normal internal effective pressure of said gas with activated alumina in contact with said gas which materially reduces the normal effective pressure of said gas when said container is relatively full of said beer and which negligibly reduces the normal effective pressure of said gas when said container is relatively empty of said beer whereby said beer is discharged from said container at a substantially constant pressure regardless of the amount of beer in said container.

7. In combination: a sealed container; a liquid in said container to be discharged from said container; a valve for discharging said liquid from said container under controlled conditions; an expandable chamber having a movable wall pushing against said liquid in said container; a propellant gas in said chamber to push said wall against said liquid; and an adsorbent agent in contact with said propellant gas materially to reduce the normal effective pressure of said propellant gas when said container is relatively full of said liquid and negligibly to reduce the normal effective pressure of said propellant gas when said container is relatively empty of said liquid whereby said liquid is discharged from said container at a substantially constant pressure regardless of the amount of liquid in said container.

8. A method of discharging a liquid contained in a sealed container which comprises: discharging said liquid from said container under controlled conditions by pushing against said liquid in said container by means of an isolated propellant gas contained in an impervious expandable chamber under internal pressure of said gas and modifying the normal internal effective pressure of said gas with an adsorbent agent which materially reduces the normal effective pressure of said propellant gas when said container is relatively full of said liquid and which negligibly reduces the normal effective pressure of said gas when said container is relatively empty of said liquid whereby said liquid is discharged from said container at a substantially constant pressure regardless of the amount of liquid in said container.

9. In combination: a sealed container; a liquid in said container to be discharged from said container; an expandable bag in said container; solidified propellant gas in said bag; and an adsorbing agent in said bag to materially reduce the normal effective pressure of said propellant gas when said solidified propellant gas turns to vapor and when said container is relatively full of said liquid, said agent negligibly reducing the normal effective pressure of said propellant gas when said container is relatively empty of said liquid whereby said liquid is discharged from said container at a substantially constant pressure regardless of the amount of liquid in said container.

10. A method of pressurizing a liquid contained in a sealed container which comprises: placing a solidified propellant gas in an expandable bag; placing an adsorbing agent in said bag; placing a liquid in said container, said liquid to be subsequently dispensed from said container; placing said filled bag in said container; and changing said solidified propellant to vapor whereby said agent reduces the normal effective pressure of said propellant gas when said container is relatively full of said liquid and to negligibly reduce the normal effective pressure of said propellant gas when said container is relatively empty of said liquid whereby said liquid is discharged from said container at a substantially constant pressure regardless of the amount of liquid in said container.

References Cited in the file of this patent

UNITED STATES PATENTS

| | | |
|---|---|---|
| Re. 24,918 | Mills | Jan. 3, 1961 |
| 168,546 | Westcott | Oct. 5, 1875 |
| 445,257 | Beck | Jan. 27, 1891 |
| 609,970 | Lochmann | Aug. 30, 1898 |
| 1,608,155 | Barneby | Nov. 23, 1926 |
| 1,959,815 | Corcoran | May 22, 1934 |
| 2,689,768 | Falligant | Sept. 21, 1954 |
| 2,794,579 | McKernan | June 4, 1957 |
| 2,954,935 | Stearnes et al. | Oct. 4, 1960 |